WILLIAM A. EDSON
INVENTOR.

BY Urban H. Faubion

ATTORNEY

WILLIAM A. EDSON
INVENTOR.
BY Urban H. Faubion
ATTORNEY

WILLIAM A. EDSON
INVENTOR.
BY Urban H. Faubion
ATTORNEY

United States Patent Office 3,128,433
Patented Apr. 7, 1964

3,128,433

T.W.T. FREQUENCY CHANGER UTILIZING INDUCED GENERATION OF MODULATION SIGNAL

William A. Edson, Los Altos, Calif., assignor to General Electric Company, a corporation of New York Filed Apr. 7, 1960, Ser. No. 20,754
8 Claims. (Cl. 328—25)

This invention relates to high frequency energy interchange devices which depend upon an interchange of energy between an electron stream and a radio frequency field for operation. More particularly the invention relates to such a device which performs frequency composition functions.

Frequency composition may be defined as the technique of producing a desired frequency indirectly by means of modulation (mixing of two or more frequencies), frequency multiplication, frequency division, addition of frequencies, subtraction of frequencies and any combination of these operations. The present invention is specifically directed to a high frequency energy interchange device and system which may be utilized to perform frequency composition by modulation and the special case of modulation known as frequency subtraction.

In many system applications it is necessary to produce a frequency which is an integral fraction of some available input frequency. Frequency division is satisfactorily performed at low and medium frequencies by existing devices but is poorly performed at microwave frequencies. The frequency divider disclosed is provided to improve the state of the art in microwave frequency division. The frequency divider disclosed has the desirable characteristics of operating over a substantial range of frequencies without readjustment of any kind and accomplishing this result with a minimum amount of equipment. Further, the arrangement has the advantage that it does not produce an output in the absence of a suitable input signal and it produces a frequency which remains equal to the pre-set integral fraction of the input frequency while the input frequency is varied through a substantial range of frequencies.

In carrying out the invention a balanced modulator which produces an output wave that represents the difference between two applied modulated waves is utilized with circuitry which provides for one of the applied waves to be derived from the output of the balanced modulator. The frequency of the subtracted input wave may be selected to determine the degree of division which is obtained. More particularly, the invention embodies a traveling wave tube wherein an electron stream flows in close proximity to an electromagnetic wave transmission line, which may be in the form of a helix, whereby an energy-exchanging interaction takes place between the electron stream and waves traveling along the transmission line. An input coupler is located near the source of the electron stream to transfer the input wave onto the transmission line, whereupon the wave transfers energy to the electron stream to cause electron velocity modulation at the frequency of the input wave, and the wave is amplified. A helical coupler located downstream from the input coupler is provided to transfer a second wave onto the transmission line. Interaction takes place between the velocity modulated electron stream and this second wave to provide modulation products representing the sum and difference of the frequencies of the stream velocity modulation and the second wave. The frequency difference modulation product is extracted from an output terminal of the helical coupler and a portion thereof is transmitted through a frequency selective filter to an input terminal of the helical coupler to provide the aforementioned second wave. Accordingly the frequency of the frequency difference modulation product represents a predetermined fraction of the frequency of the input wave, even though the frequency of the input wave is varied. By adjusting the length of the helical coupler to be less than that required for full transfer of power of the second wave to the transmission line, no amplified portion of the second wave is extracted from the transmission line. Therefore, no substantial component of the frequency of the second wave appears with the extracted frequency difference modulation product and independent oscillation of energy at the frequency of the second wave cannot take place.

The features which are characteristic of this invention and are believed to be novel are set forth with particularity in the appended claims. The invention itself, however, both as to its organization and method of operation together with further objects and advantages thereof may best be understood by reference to the following description taken in connection with the accompanying drawings in which:

Figures 1, 2:
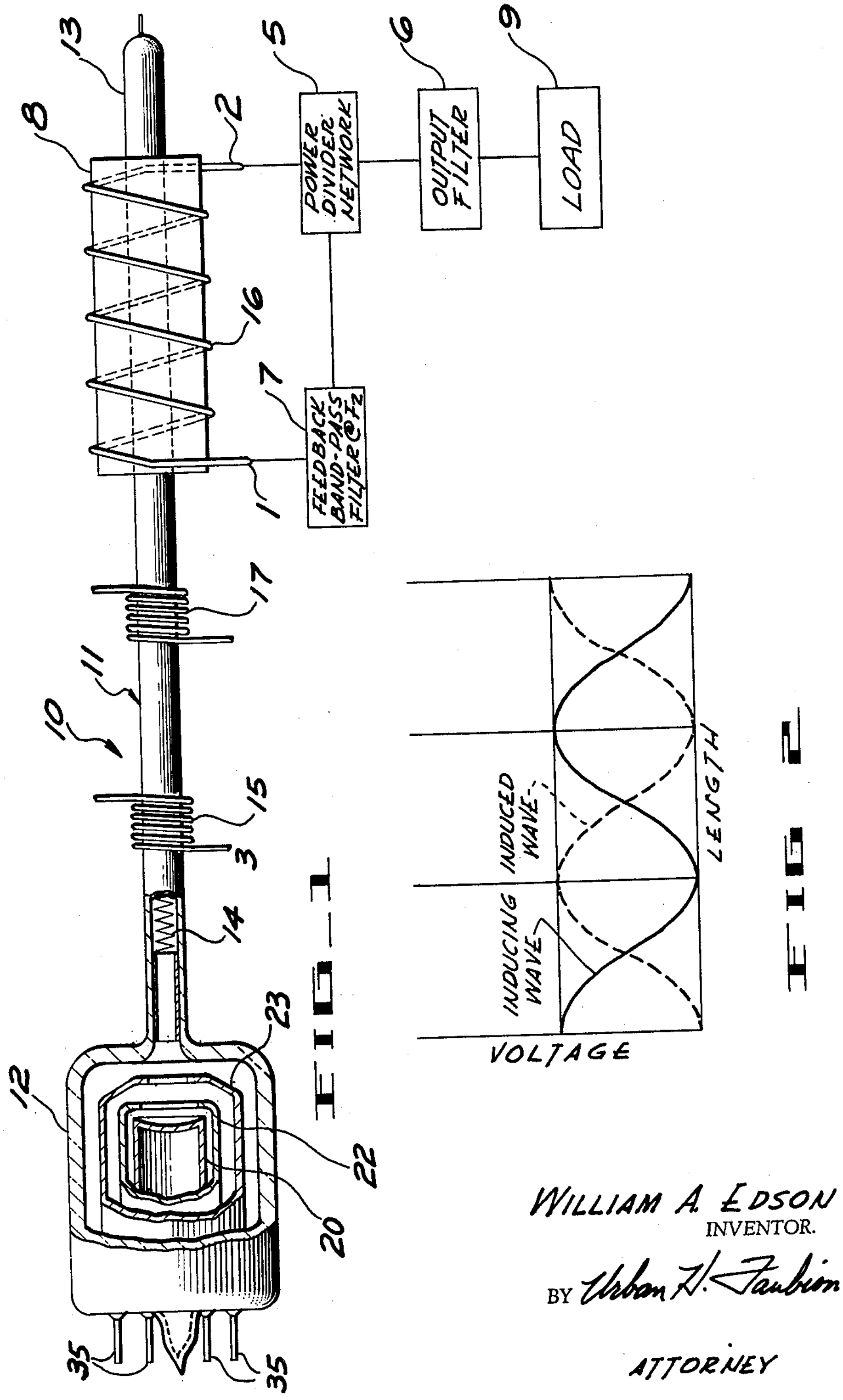
FIGURE 1 is a side elevation which shows a frequency divider constructed in accordance with the principles of the present invention including a vacuum tube (partially broken away and partially in section) constructed to perform the balanced modulator action desired and associated circuitry (shown in block form) for providing the frequency division.
FIGURE 2 is a plot of voltages along coupled transmission lines of the balanced modulator illustrated in FIGURE 1 showing the transferral of energy between directionally coupled transmission lines.
Figure 3:
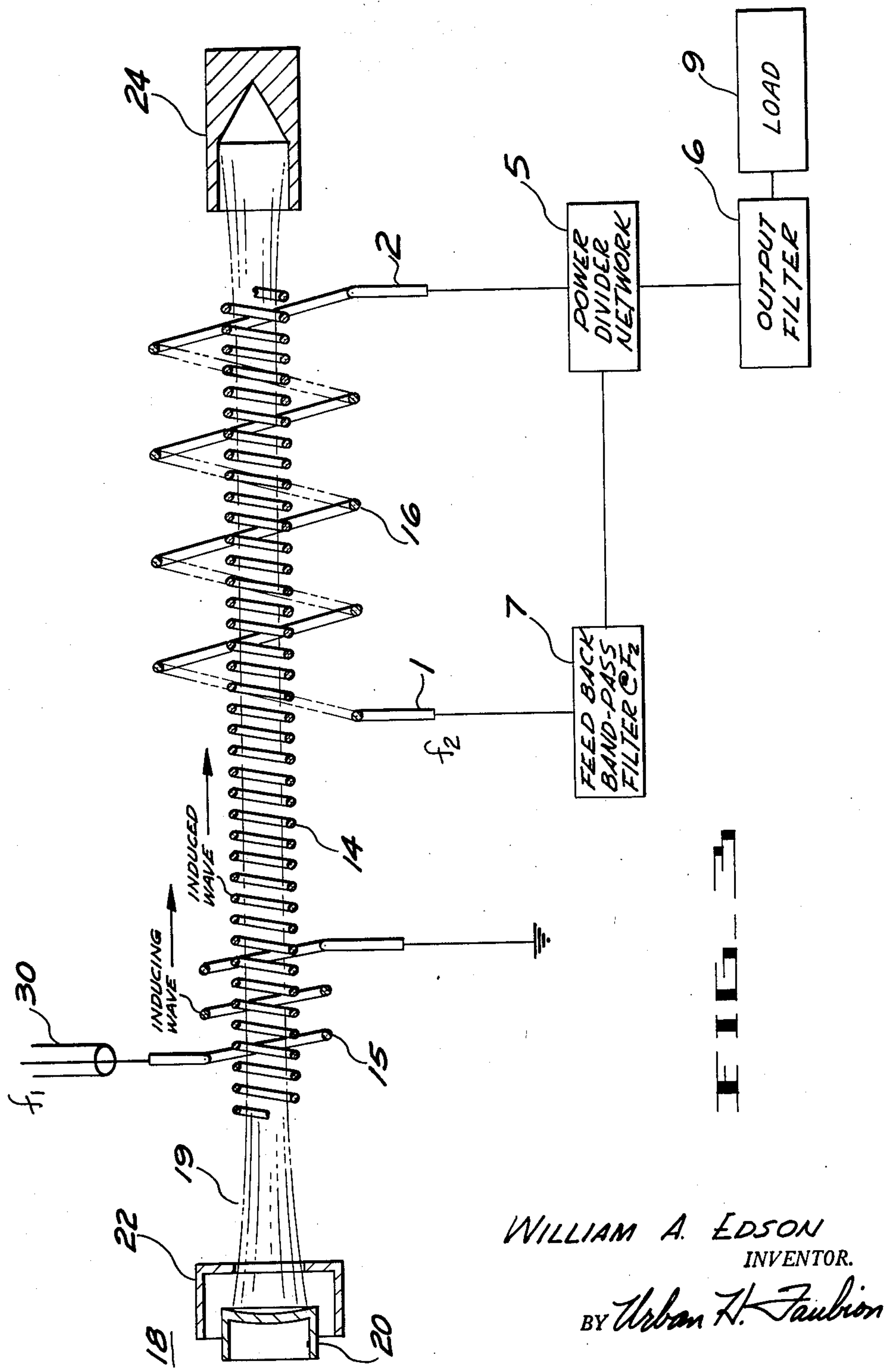
Figure 4:
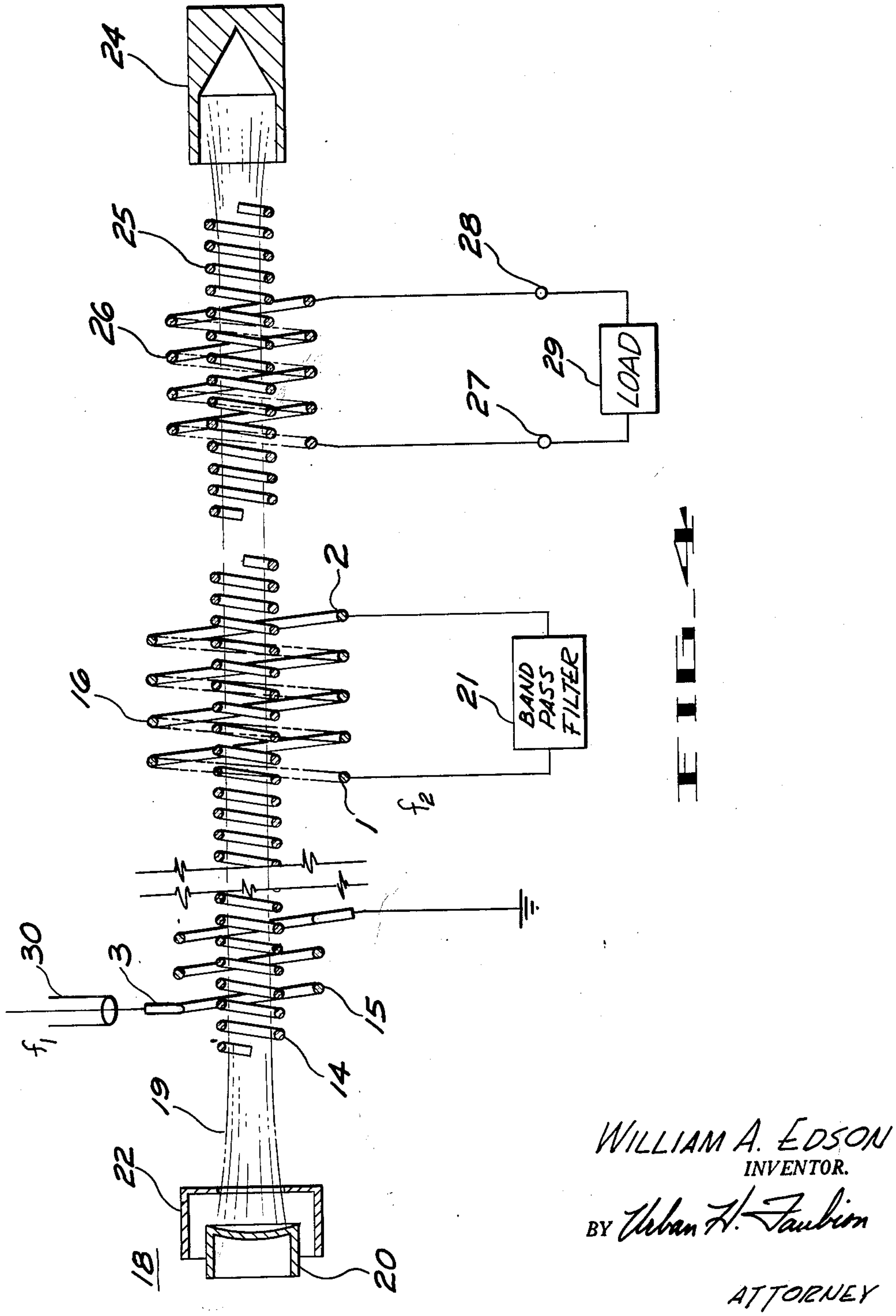

FIGURE 3 is an enlarged detailed view illustrating the arrangement of coupled transmission lines with respect to the internal helical main transmission line of a traveling-wave tube balanced modulator of the type illustrated in FIGURE 1 showing a microwave frequency divider constructed in accordance with the principles of the present invention; and FIGURE 4 is a detailed view similar to that of FIGURE 3 illustrating a generalized microwave frequency changer utilizing the principles of the present invention.

As illustrated in FIGURE 1 a traveling-wave tube balanced modulator 10 is used. The balanced modulator is of the type illustrated, described, and claimed in the copending application S.N. 687,497, entitled Balanced Modulator, filed September 25, 1957, now Patent No. 2,993,139, in the name of the present inventor and assigned to the assignee of the present invention. In order to make the present description complete the balanced modulator and its operation is again described below. However, it seems most logical to consider the over-all operation of the frequency divider and particularly the special case of a frequency halver prior to considering details of the modulator 10 and other specific circuit components. Consequently, assume that the balanced modulator 10 provides an output wave which has a frequency equal to the difference between two input frequencies $f_1$ and $f_2$ which are applied at the input terminals 3 and 1 of input and output couplers 15 and 16 respectively. The difference frequency $(f_1-f_2)$ appears at the output terminal 2 of the output coupler 16.

The frequency divider is obtained by applying the output wave of the modulator 10 back to the input terminal 1 of the output coupler 16. As illustrated in FIGURES 1 and 3, this is accomplished by connecting output terminal 2 of the output coupler 16 to a power divider network 5 which passes some of the applied power directly through to an output filter 6 and diverts some of the applied power to a feed back band pass filter 7 which is designed to transmit the output frequency. The output filter 6 is connected to supply a load device 9. In the absence of an input frequency to the input coupler 15 there is no output voltage, however, when an input is supplied the balanced modulator 10 will convert any assumed frequency $f_1$ applied at the input coupler into a difference frequency $f_1-f_2$ as previously described. Since a closed loop is provided between the input and output terminals 1 and 2 of the output coupler 16 the assumed frequency applied at the input terminal 1 of the output coupler 16 must be equal to the output frequency. This can only happen if the output frequency and the frequency applied to the input terminal 1 of the output coupler 16 is equal to one half of $f_1$. In other words, when a frequency $f_1$ is applied to the input terminal of the input coupler 15 the conditions for regeneration in the feedback loop from the output terminal 2 of the output coupler 16 back to its input terminal 1 are satisfied and a signal at a frequency equal to one-half of $f_1$ builds up from the level of thermal noise. Since the traveling-wave tube is a broadband device, the input frequency may be varied over a very wide range (approximately an octave) without loss of the dividing property. From the description of operation, it is seen that part of the output signal is required for regeneration and the remainder is available as useful output.

In the embodiment of FIGURES 1 and 3, the closed loop around the output coupler 16 may be traced from output terminal 2 through the power divider network 5 and the feedback band pass filter 7 to the input terminal 1. The power divider network 5 may comprise a conventional directional coupler or simple branching network. For example, one such coupler is illustrated in FIGURE 14.24 on page 874 of volume 11 of the Radiation Laboratory Series, entitled Technique of Microwave Measurements, edited by Carol G. Montgomery, First Edition, McGraw-Hill Book Company, 1947. A suitable band pass filter for use as the feedback filter 7 is illustrated as Filter No. 1 in FIGURE 10.23 in volume 9 of the Radiation Laboratory Series, Microwave Transmission Circuits, edited by George L. Ragan, First Edition, Third Impression, McGraw-Hill Book Company, Inc., 1948. The output filter 6, if used, may also be of the same type as the feedback filter 7.

Many variations of the basic arrangement of FIGURES 1 and 3 are possible. For example, in many instances it is possible to omit either or both of the band pass filters 6 and 7. Also the system may be made a more generalized frequency changer. Before the generalized frequency changer is described, however, it seems appropriate to explain the operation of the balanced modulator 10.

An understanding of the balanced modulator traveling-wave tube may be had by referring to FIGURES 1 and 3 of the drawings. From these figures, it is seen that traveling-wave tube 10 is provided with an envelope 11, that is generally long and cylindrical with an enlarged cylindrical portion 12 at one end which houses an electron stream producing gun 18 and a small slender cylindrical portion 13 which houses the long helical main interaction transmission line 14 commonly referred to as the beam helix. The particular tube illustrated is quite long since a considerable length is required to provide the desired interaction with the electron stream and also to obtain the type of directional coupling between the external input and output transmission lines or coupler coils 15 and 16 respectively, and the main transmission line 14. The particular tube illustrated was designed to operate in the X-band region; that is, in the region of frequencies between 7000 and 12,000 megacycles.

The input coupler 15, is provided to couple an electromagnetic wave at one frequency $f_1$ onto the main transmission line 14 and consists of a coil of wire wound around the slender portion 13 of the envelope 11 which is nearest the enlarged portion 12 provided for the electron gun 18. The second or output coupler 16 also consists of a conductor wound around an annular non-magnetic spacer 8, at the opposite end of the envelope 11 which is provided to couple a second electromagnetic wave of frequency $f_2$ onto the beam helix or transmission line 14 of the traveling-wave tube and simultaneously to couple an output wave off from the beam helix 14. The diameter of the output coupler 16 is made very large with respect to that of the beam helix 14 in order to provide a very loose coupling between the two transmission lines. The reason for this is explained more fully in connection with the detailed description of the operation of the modulator.

In order to completely attenuate any energy reflected from the output end of the tube and prevent external coupling between the input and output couplers 15 and 16, still a third coupler 17, called an attenuator, is wound around the envelope of the tube intermediate the input and output couplers 15 and 16. The attenuator 17 is preferably shorted on itself to form a closed loop and since attenuation is most effective if the attenuator 17 is lossy, it preferably consists of a high resistance wire.

It is to be particularly understood that the invention is described in connection with the particular type of traveling-wave tube illustrated only as a matter of convenience and the transmission lines and couplers may take any form which will meet the boundary conditions set forth in the following description. For example, instead of using the helical slow-wave circuit 14 illustrated, a periodically loaded waveguide structure may be used and the couplers 15 and 16 could then be replaced by any known type of transmission line which may be coupled to the slow-wave circuit in the general manner described herein.

The enlarged portion 12 at one end of the evacuated envelope encloses an electron gun 18 for producing a stream of electrons along the axis of the envelope 11 as depicted by the broken lines 19. The electrons which are formed into a stream are emitted from a cathode 20, in response to heat applied thereto by a heater (not shown). The electron stream is formed and projected along the axis of the tube by a centrally apertured electron stream focusing electrode 22 and a centrally apertured electron stream accelerating anode 23. Since the elongated beam helix 14 is positioned inside the slender portion 13 of the envelope with its axis coincident with the tube axis, the electron stream 19 flows down the length of the tube in close proximity thereto, thus providing an interaction region along the tube axis. A collector anode 24 is positioned at the opposite or output end of the structure to dissipate residual energy in the stream.

In order to prevent the space charge of the electrons from spreading them to such an extent that they pass out of the interaction region, it is necessary to provide some focusing means. Focusing is provided by producing a magnetic field axially along the structure. This is typically done by providing an annular solenoid which surrounds the entire tube along its length. To simplify the present drawing and description, the magnetic field producing solenoid and the source of operating power for the tube are not illustrated. Electrical connections to the parts of the electron gun 18 are brought out on pins 35 (shown in FIGURE 1) but are shown schematically here to simplify the drawings. The relative potentials of the electrodes of the electron gun is determined by well known gun design considerations. (See J. R. Pierce, Theory and Design of Electron Beams, Second Edition, 1954, Van Nostrand Co.)

A desired voltage wave is coupled or transferred onto the slow-wave transmission line or beam helix 14 in such a manner that the transferred wave is propagated from the gun end of the tube toward the collector end. As may best be seen in FIGURE 3, the input coupler or transmission line 15 is a helical coil wound externally of the tube and coaxially with the beam helix 14 and the input wave is introduced thereon by means of a coaxial transmission line 30. In order to provide the proper directional coupling between two coaxial helices, the input coupler 15 is wound in an opposite sense to the beam helix 14. As illustrated in the drawing, the beam helix 14 is a right hand wound helix and the input coupler 15 is a left hand wound helix. The input helical coupler 15 is essentially a type of directional coupler and may be described in terms of well known coupled transmission line theory as discussed in the article, "Directional Electromagnetic Couplers," by B. M. Oliver, in the Proceedings of the I.R.E., volume 42, 1954, pages 1686–1692, and the article, "Helix Coupled Traveling-Wave Tubes," by Peter D. Lacy, in the November 1954 issue of Electronics Magazine, pages 132–135. For example, it is well known that where two parallel transmission line systems have mutual coupling between them along their length, a wave on one system will excite a wave traveling in the opposite direction upon the other transmission line system. If these systems are formed into two parallel helices wound in opposite senses, the coupled or induced wave will travel in the same direction as the inducing wave even though the coupled wave is induced in the opposite direction. This relationship exists between input coupler helix 15 and the beam helix 14 since they are oppositely wound and coaxial. The direction of the inducing and induced waves are indicated by the arrows marked inducing wave and induced wave in FIGURE 3. In this figure, the inducing wave is introduced on the left hand wound input coupler helix 15 by means of a coaxial transmission line 30 and the induced wave is built up on the right hand wound beam helix 14 in such a manner that both waves proceed away from the electron gun 18 along the tube 10 toward the output end.

It is an additional property of two coupled systems having the same velocities of propagation that all of the power in a wave on one system (the primary system) is transferred to the other system (the secondary system) and if the systems are long enough, the power flow reverses and the power in the secondary system is transferred back to the primary system. This relationship is illustrated in connection with FIGURE 2 wherein the sinusoidal wave labeled "inducing wave" represents the wave as produced on the input helix or transmission line 15 (the primary system) and the broken line sinusoidal wave marked "induced wave" indicates the wave on the beam helix 14. An inspection of the system shows that initially all of the primary wave is on the input coupling helix 15. As the wave is propagated from left to right along the length of the two systems, the voltage from the inducing wave is transferred therefrom. In designing the input coupler 15, its length is selected so that all of the power in it is transferred to the beam helix 14. As described in the Lacy article supra this power transfer from one helical transmission line to the other is maximum for a quarter space-beat-wavelength section (i.e., the space-beat-wavelength as distinguished from actual or guide wavelength). The beat-wavelength depends upon factors such as degree of coupling etc., it may be very long, many times the actual wavelength, if the coupling is low. In practice the coupling between the input coupler 15 and the beam helix 14 is made fairly tight so that all of the primary power may be transferred to the beam helix by a relatively short helix (of the order of a wave length). Thus, electromagnetic fields are generated inside the beam helix 14 (in the interaction region) throughout its length.

The portion of the modulator thus far described, then, acts as a conventional traveling-wave amplifier. That is to say, the electromagnetic waves in the beam helix 14 interact with the electrons in the stream to produce electron velocity modulation and consequently electron bunching. As the wave and beam travel along the helix, the phenomenon reverses and the bunched beam induces fields and currents along the helix and the amplitude of the wave on the helix grows exponentially until the stream becomes saturated because the stream gives up more enrgy to the beam helix 14 than it abstracts from it.

It should be noted here that the presence of an electron stream within the coaxial transmission line affects the coupling between the two helices in that it has an effect upon the length of transmission line required to transfer 100% of the power from one line to the other. It does not, however, alter the basic coupling principle in any way. It may also be worthwhile to note that an electron stream passing through two helical transmission lines which are coaxial does not interact in any appreciable amount with electric and magnetic fields produced by the outer transmission line. Thus, when considering the operation of a device such as described herein it is valid to assume that waves on the coupler helices 15 and 16 must be transferred in some measure to the beam helix 14 before the beam interacts therewith and further that energy transfer takes place between the two transmission lines in accordance with general directional coupling theory.

As the electron stream enters the second or output coupling helix 16, the electrons therein are bunched in accordance with the frequency $f_1$ of the wave introduced on the input coupler 15 and the beam transmission line 14 is propagating an amplified wave which is of the same frequency as that induced thereon by the input coupler 15.

The output coupler helix 16 is wound in an opposite sense to the beam helix in the same manner as described with respect to the input coupling helix. Therefore, any wave induced along the beam helix 14 by the output coupler helix 16, travels along the beam helix 14 in the same direction as the inducing wave on the output coupler helix and further any wave induced on the output coupler helix 16 by the beam helix 14 will also be propagated along the output coupler helix 16 in the same direction as the inducing wave is propagated on the beam helix. Thus, without further explanation it may be seen that the wave propagating along the beam helix 14 at the frequency $f_1$ introduced by the input coupling helix 15, may be coupled out on the output coupler helix 16 and by properly selecting the length of the helix, substantially 100% of the power in the wave on the beam helix 14 may be transferred to the output helix 16. Consequently, an output is produced at the output helix 16 which has a frequency $f_1$ as produced by the input helix 15.

More important, however, with respect to the length of the output coupler 16, is the frequency $f_2$ of the second wave which is introduced on input terminal 1 of the output coupler 16. The wave so introduced is that which is to be modulated with the wave introduced on the input coupler 15. The length of the output coupler 16 may be selected so that all or substantially all of the power introduced thereon is transferred to the beam helix 14, and the power flow will not have started to reverse from beam helix 14 to output coupler 16. This condition is essential for and leads to the production of balanced modulator action.

The output coupler helix 16 has a considerably larger diameter than the beam helix 14 or the input coupler 15 so that it is more loosely coupled to the beam helix 14 than is the input coupler 15. The purpose of making this coupling loose is to ensure that the length of the output coupler helix 16 required for 100% coupling of the frequency $f_2$ introduced onto this coupler will be a substantial portion of the beam helix length. In this manner a relatively long portion of the beam helix 14 provides interaction between a wave propagating therealong at the frequency $f_2$ and the electron stream 19 which is already modulated at the frequency $f_1$. Thus the electrons in the nonlinear modulated stream 19 are further modulated at the frequency $f_2$ introduced in the output helix 16 and provide a gain or amplification of the wave so introduced along the beam helix 14. Because the power introduced at the second frequency $f_2$ will not begin to be transferred back to the output helix 16 until a point is reached on the beam helix 14 which is actually outside the end of the output coupler 16, none of the amplified component of the wave at the frequency $f_2$ is produced on the output terminal 2 of the output coupler 16. However, in the interaction area within the ends of the output coupler 16, the electron stream produces its own wave on the beam helix which wave contains components including the sum and difference of the frequencies of the waves applied to the input and output couplers 15 and 16. These sum and difference freqencies; i.e., $f_1+f_2$ and $f_1-f_2$, are the side bands commonly referred to in modulator parlance. These two side bands are produced on the beam helix 14 and grow toward the output end of the tube. The signals of side band frequency are coupled from the beam helix 14 onto the output helix 16 by the directional coupling mechanism described in connection with FIGURE 4. Thus the output helix propagates waves having the frequency $f_1$ applied to the input coupler 15, and the sum of the frequencies applied to the input and output couplers 15 and 16 $(f_1+f_2)$ as well as the difference between these two frequencies $(f_1-f_2)$ and the waves containing these frequency components may be taken off at the output terminal 2 of output coupler 16. The action of the apparatus is precisely that of a balanced modulator.

Since the action described is dependent upon the interaction of a wave of one frequency upon an electron stream already bunched at another frequency, it is obvious that the stream does not have to be bunched by the particular mechanism described, but that any means for bunching the stream prior to interaction with a wave of second frequency is within the contemplation of the present invention. For example, it is feasible to utilize a space charge bunching technique such as would be obtained by applying a time varying voltage to the accelerating anode of an electron gun or by interposing a grid in the electron stream and varying the voltage applied to the grid at a modulating frequency. Further the type of bunching generally known as klystron gap bunching might be used. Still another example of a means of prebunching the stream before utilizing it to obtain the modulating action is found in a conventional severed helix tube. In this arrangement, the input beam helix may be used to provide the prebunched electron stream. These arrangements offer a broad range of opportunities for producing a balanced modulator using a high frequency energy interchange device which depends upon the interchange of energy between an electron stream and a radio frequency field propagating through a common interaction region.

A generalized frequency changer, as previously referred to may be obtained by changing the band pass filter 7 in the regenerative feedback loop which is utilized to determine the input frequency of the output coupler 16 to a filter which will pass some frequency represented by $mf_1/n$ where $m$ and $n$ are both fairly small integers and changing the passband of the output filter 6 to accommodate the resultant difference frequency which may be represented by $pf_1/n$ where $p$ is another integer.

The generalized frequency changer operates in the following manner. Initially a wave having a frequency $f_1$ is applied to the input coupler 15 at its input terminal 3. The electron stream 19 is modulated at this frequency and the radio frequency wave is amplified. If we assume a frequency $mf_1/n(f_2)$ applied at the input terminal 1 of the output coupler 16 the balanced mixer operates in its usual fashion to produce a frequency at the output of the output coupler 16 which is the difference between these frequencies, that is, $f_1-mf_1/n$, or $pf_1/n$. The frequency of the wave applied at the input terminal 1 of output coupler 16 is represented by $mf_1/n$ since the feedback band pass filter 7 is designed to pass this frequency.

As an example let us assume $m=2$ and $n=3$. Under these circumstances the output frequency is represented by $f_1-2f_1/3$, or $f_1/3$ thus $p=1$. Other divisions can be obtained by making $m$ and $n$ other integers, e.g., if $m=3$ and $n=4$ the output frequency is $f_1/4$.

Additional benefits of electron coupling may be obtained by severing the main helix and taking the output from the separate helix. Using this arrangement the desired modulation is introduced on to the electron stream of the balanced modulator and the electromagnetic waves are not propagated past the first portion of the severed helix. Thus, the electromagnetic waves generated on the output section of the severed helix are generated by the modulated electron stream. The structure of generalized frequency changer which results from this modification is illustrated in FIGURE 4.

Since only a very few structural changes are made in the frequency changer illustrated in FIGURES 1 and 3 to obtain the generalized frequency changer of FIGURE 4 the components which are common to both embodiments are given identical reference numerals. The first difference between the two embodiments noted is that the coupler 16 which served as the output coupler in the embodiment of FIGURE 3 has a closed loop feedback circuit from its output terminal 2 to its input terminal 1. This feedback circuit includes a band pass filter 21 of the same general type as the feedback band pass filter 7 illustrated in FIGURE 1 and previously described.

This portion of the balanced modulator operates in exactly the same manner as the balanced modulator illustrated in FIGURE 3. In other words an input wave having a frequency $f_1$ is introduced on the helical input coupler or transmission line 15 which is wound externally of the tube and coaxially with respect to the main helix 14. The wave thus introduced is coupled on to the main helix 14 in such a manner that the electromagnetic wave travels down the helix away from the electron gun 18 and toward the output end of the tube. The traveling-wave tube 10 operates in such a manner that this wave grows on the main helix 14 and is transferred to the output coupler 16 (also a helical tranmission line wound coaxially with respect to the tube and main helix 14). The band pass filter 21 which is utilized to interconnect the input and output terminals 1 and 2 of the output coupler 16 is designed to pass a frequency represented by $f_2=(mf_1/n)$. This frequency $(f_2)$ builds up out of the thermal noise and is applied to the input terminal 1 of the output coupler 16. Thus, the electron stream 19 is modulated by the two frequencies $f_1$ and $f_2$.

The frequencies which appear on the electron stream 19 are represented by the two frequencies introduced, the sum and difference of these frequencies, and the many other modulation frequencies resulting from modulation of higher orders. It is felt that discussion of these frequencies is not warranted in this application since the frequencies which result from the various orders of modulation may be found in many elementary text books. For example, the results of second, third, and $n$th order modulation are found in chapter 8 of Communication Engineering by W. L. Everitt, Second Edition, McGraw-Hill Book Company, Inc., 1937. Since these frequencies appear on the electron stream 19, electromagnetic waves of like frequencies are generated on the output helix 25 of the modulator. Residual energy from the electron stream 19 is again collected by the conductive collector 24.

A second output coupler or coupler which we shall call a modulation coupler is wound concentrically around the severed output helix 25 for the purpose of coupling electromagnetic energy off of this helix. The modulation coupler 26 is designed on the same principle as the input coupler 15 and output coupler 16 which have already been described. The electromagnetic waves coupled off the severed helix 25 by the modulation coupler 26 appear between the output terminals 27 and 28 of the modulation coupler 26. These waves contain all of the frequencies which are introduced on the beam on the electron stream 19, that is, all of the modulation frequencies. Thus, any of these frequencies may be selected and utilized by the use of the proper filter in conjunction with the load 29 connected between output terminals 27 and 28. Any frequency $f_3$ can be selected where $f_3$ is represented by $pf_1/n$. Thus, as a typical but non-restrictive example one may have $m=2$, $n=3$, and $p=4$ in which case the output frequency $f_3$ is 4/3 of the input frequency $f_1$.

While particular embodiments of the invention have been shown it will, of course, be understood that the invention is not limited thereto since many modifications, both in the circuit arrangements and in the instrumentalities employed, may be made. It is contemplated that the appended claims will cover any such modifications as fall within the true spirit and scope of the invention.

What I claim is new and desire to secure by Letters Patent of the United States is:

1. In combination in a frequency dividing system a high frequency energy interchange device of the type wherein an interaction takes place between a stream of electrons and radio frequency fields, said high frequency energy interchange device including an evacuated envelope, an electromagnetic wave propagating main transmission line within said envelope, electron stream producing and directing means within said envelope for producing and directing a stream of electrons in close proximity to said transmission line, output coupling means including an output transmission line positioned in energy interchange relationship with said transmission line for simultaneously introducing a time varying electromagnetic wave along said transmission line and extracting electromagnetic waves therefrom, said output coupling transmission line comprising a section of substantially a quarter space-beat-wavelength for frequencies to be introduced thereon and having input and output terminal means electrically interconnected whereby energy is returned from said output terminal to said input terminal, and means to bunch electrons along the stream prior to interaction with the time varying electromagnetic wave introduced on said transmission line by said output coupling means.

2. The combination in frequency dividing system, a high frequency energy interchange device of the type wherein an interaction takes place between an electron stream and radio frequency fields in an evacuated envelope of an electromagnetic wave propagating transmission line inside said evacuated envelope, an output coupling transmission line for simultaneously introducing a time varying electromagnetic wave on said wave propagating transmission line and extracting electromagnetic waves therefrom positioned in close proximity to at least a portion of said wave propagating transmission line whereby electric coupling is provided between said transmission lines, said output coupling means comprising a transmission line section of substantially a quarter space-beat-wavelength for frequencies to be introduced thereon and having input and output terminal means for the introduction and extraction respectively of electromagnetic waves, and means to produce an electron stream having electrons distributed therealong in accordance with a time varying electromagnetic fields in said evacuated envelope in close proximity to the portion of said wave propagating transmission line in the region of coupling with said output coupling transmission line; feedback circuit means interconnecting the said input and output terminals of said output coupler, said feedback circuit means including a branching network means connected to the said output terminal which network passes some of the incident energy for use in a load circuit and diverts a portion of the incident energy to the said input terminal whereby the energy passed by said network means has a frequency which is a fraction of the frequency of the time varying parameter which distributed electrons along said stream.

3. A frequency dividing system for operation in the centimeter wave length region including a high frequency energy interchange device wherein an interaction takes place between an electron stream and radio frequency fields, said energy interchange device including an elongated evacuated envelope, an electron stream directing means at one end of said envelope and an electron collecting means at the opposite end of said envelope, an electromagnetic wave propagating transmission line positioned in said envelope intermediate said electron stream producing means and said collector means whereby said electrons pass in close proximity to said transmission line, an output coupler transmission line positioned adjacent said wave propagating transmission line along its length in directionally coupled relationship therewith whereby waves propagated along one of said transmission lines are transferred to the other one of said transmission lines, said output coupler transmission line having electrical input means for introduction of one time varying electromagnetic wave and electrical output means for delivering a second time varying electromagnetic wave and being substantially a quarter space-beat-wavelength in terms of the frequency of electromagnetic waves introduced on said output coupler transmission line and means to redistribute electrons along said stream in response to another applied time varying wave prior to entry into the region of energy transfer between said transmission lines; and a feedback circuit means interconnecting said input and output terminal of said output coupler, said feedback circuit means including a branching network of the type which passes a portion of incident energy and divert another portion and a filter means which passes a desired frequency, said branching network and filter connected between said output and input in such a manner that said branching network receives energy from said output coupler diverts portion back to said input terminal through said filter and passes a portion to be utilized in a useful load.

4. In a frequency divider for operation in the centimeter wave length region, an elongated evacuated envelope, a main transmission line disposed within said envelope, said main transmission line including an input section and a severed output section concentrically disposed in end-to-end relationship in such a manner that electromagnetic waves propagated on said input section do not propagate on said output section, electron gun means disposed at one end of said envelope for directing an electron stream therethrough in close proximity to said main transmission line, modulating means for bunching electrons along said stream in accordance with a time varying electrical parameter, and an output coupler transmission line directionally coupled to the input section of said main transmission line along its length in a region traversed by the prebunched electron stream in such a manner that a transferral of waves propagated on said transmission lines occurs, said output coupler transmission line having input and output terminal means for simultaneous introduction and extraction of electromagnetic waves and being substantially a quarter space-beat-wavelength in terms of the frequencies of electromagnetic waves introduced thereon, feedback circuit means interconnecting said input and output terminal means and modulation coupler means positioned in close proximity to at least a portion of said output section of said main transmission line whereby transfer of electromagnetic waves occurs between said output section and said coupler, and means to connect a useful load to said modulation coupler.

5. A frequency dividing system comprising an evacuated envelope, an electromagnetic wave propagating main transmission line within said envelope, an electron gun within said envelope for producing and directing a stream of electrons in close proximity to said transmission line, bunching means disposed near said electron gun for bunching the electrons of said stream at a first frequency, a coupler transmission line disposed along said main transmission line and coupled in energy interchanging relationship therewith, a filter for passing electromagnetic energy having a predetermined frequency range, the frequencies of said range being less than said first frequency, means for coupling said filter to one end of said coupler transmission line to receive electromagnetic energy therefrom, and means for coupling said filter to the other end of said coupler transmission line to deliver electromagnetic energy thereto, whereby the electromagnetic energy delivered by said filter has a frequency representing a frequency difference modulation product of said first frequency and a frequency less than said first frequency.

6. The system of claim 5, wherein the length of said coupler transmission line in a direction along main transmission line is less than the length required to effect a complete transfer from said coupler transmission line to said main transmission line of electromagnetic waves having frequencies within said frequency range.

7. The system of claim 6, wherein said main transmission line comprises a first helix and wherein said coupler transmission line comprises a second helix surrounding a portion of the length of said first helix and wound in opposite sense to said first helix.

8. The system of claim 5, wherein said frequency range includes a frequency having a value one-half of said first frequency.

References Cited in the file of this patent

UNITED STATES PATENTS

| | | |
|---|---|---|
| 2,795,761 | Bradley | June 11, 1957 |
| 2,814,779 | Mendel | Nov. 26, 1957 |
| 2,964,671 | Chang | Dec. 13, 1960 |
| 2,981,889 | Webber | Apr. 25, 1961 |

OTHER REFERENCES

Electronics, November 1954, pages 132 to 135, Lacy: "Helix Coupled Traveling-Wave Tubes."